15# (12) United States Patent
Miura et al.

(10) Patent No.: US 7,671,129 B2
(45) Date of Patent: Mar. 2, 2010

(54) POLYCARBONATE/GRAFT COPOLYMER COMPOSITIONS

(75) Inventors: Takashi Miura, Tokyo (JP); Keiji Nakamura, Otake (JP); Mari Sekita, Tokyo (JP); Masahiro Osuka, Yokohama (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 884 days.

(21) Appl. No.: 10/548,444

(22) PCT Filed: Mar. 9, 2004

(86) PCT No.: PCT/JP2004/003008

§ 371 (c)(1), (2), (4) Date: Mar. 14, 2006

(87) PCT Pub. No.: WO2004/081114

PCT Pub. Date: Sep. 23, 2004

(65) Prior Publication Data

US 2006/0217496 A1 Sep. 28, 2006

(30) Foreign Application Priority Data

Mar. 10, 2003 (JP) ............................. 2003-063164
Sep. 3, 2003 (JP) ............................. 2003-311818

(51) Int. Cl.
*C08L 69/00* (2006.01)

(52) U.S. Cl. ............................. 525/67; 525/64; 525/310

(58) Field of Classification Search ........................ None
See application file for complete search history.

(56) References Cited

U.S. PATENT DOCUMENTS 5,006,592 A 4/1991 Oshima et al.
5,221,713 A * 6/1993 Kempner et al. ............... 525/71
5,516,842 A 5/1996 Hoshino et al.
6,407,167 B1 6/2002 Shishido et al.

FOREIGN PATENT DOCUMENTS

| CN | 1313883 A | 9/2001 |
| EP | 779 302 | 6/1997 |
| EP | 0 900 827 | 3/1999 |
| JP | 1-217005 | 8/1989 |
| JP | 1-297402 | 11/1989 |
| JP | 11-158365 | 6/1999 |
| JP | 2001-172458 | 6/2001 |
| JP | 3250050 | 11/2001 |

* cited by examiner

*Primary Examiner*—David Buttner
(74) *Attorney, Agent, or Firm*—Oblon, Spivak, McClelland, Maier & Neustadt, L.L.P.

(57) ABSTRACT

The present invention provides a thermoplastic resin composition capable of demonstrating impact strength, and high resistance to hydrolysis and heat discoloration without impairing the essential properties of the thermoplastic resin. The present invention provides a thermoplastic resin composition containing: 70 to 99% by mass of thermoplastic resin (A) containing a polycarbonate resin as an essential component; and 1 to 30% by mass of graft copolymer (B) which is a graft copolymer obtained by emulsion graft polymerization of a monomer or monomer mixture containing at least alkyl methacrylate in the presence of a latex containing a butadiene rubber polymer, wherein the amount of the butadiene rubber polymer included is in the range of 55 to 90% by mass, and the graft copolymer (B) is obtained by using 0.05 to 10 parts by mass of sodium alkylphenylether disulfonate with respect to 100 parts by mass of the graft copolymer (B).

2 Claims, No Drawings

POLYCARBONATE/GRAFT COPOLYMER COMPOSITIONS

TECHNICAL FIELD

The present invention relates to a thermoplastic resin composition capable of providing molded articles possessing superior impact strength and high resistance to hydrolysis and heat discoloration.

Priority is claimed on Japanese Patent Application No. 2003-063164, filed Mar. 10, 2003, and Japanese Patent Application No. 2003-311818, filed Sep. 3, 2003, the content of which is incorporated herein by reference.

BACKGROUND ART

Thermoplastic resins, chief among these being polycarbonate resins and polyester resins employed in the household electrical appliance the office automation (OA) equipment field, have excellent mechanical and chemical properties. While they are widely used across various fields for this reason, one problem which has been cited with these resins is their poor impact-resistance at low temperatures. In addition, with respect to OA applications, better resistance to heat discoloration and hydrolysis was desired in order to be recycled.

While the addition of a graft rubber such as MBS resin is effective for improving impact resistance, resistance to heat discoloration and hydrolysis declines when MBS resin is added to polycarbonate or polyester resins.

Addition of a hindered phenol, thio or phosphorous stabilizing agent is effective for improving resistance to hydrolysis and heat discoloration. However, strength may decrease depending on the amount of agent added. In addition, when a phosphorous stabilizing agent is added to a polycarbonate resin, hydrolysis can actually be promoted. As a result, a situation results in which there are limitations placed on the amount of agent added.

Japanese Patent No. 3250050, and Japanese Unexamined Patent Applications, First Publication Nos. H1-217005 and H1-297402 disclose production methods in which heat discoloration is improved by decreasing the amount of coagulating agent used in the graft copolymer latex and controlling the pH of the washing water, and thereby the amount of remaining emulsifier, which is one cause of discoloration, is decreased. However, in these production methods, it is not possible to sufficiently improve the heat discoloration of highly fluid resins such as polycarbonate and the like.

Further, as a resin composition that is capable of providing a molded article having superior impact resistance, Japanese Unexamined Patent Application, First Publication No. 2001-172458 proposes a polyvinyl chloride resin composition that includes a graft copolymer which employs a specific butadiene content and a specific particle diameter and which is made by using sulfonate and/or sulfate. However, in the obtained polyvinyl chloride composition, only impact resistance and the external appearance of the molded article are improved.

Further, Japanese Unexamined Patent Application, First Publication No. H11-158365 proposes a composition that contains an agent for strengthening impact resistance that includes a polymer assistant that does not cause deterioration in the polycarbonate resin. However, even in this composition, it is not possible to sufficiently control the breakdown of the polycarbonate.

An object of the present invention is to provide a thermoplastic resin composition which does not lose any of its essential properties, and which enables formation of a molded article having superior impact strength, and high resistance to hydrolysis and heat discoloration.

DISCLOSURE OF INVENTION

In order to achieve the object, the present invention provides a thermoplastic resin composition containing:

70 to 99% by mass of thermoplastic resin (A1) containing polycarbonate resin as an essential component; and 1 to 30% by mass of graft copolymer (B) which is a graft copolymer obtained by emulsion graft polymerization of a monomer or monomer mixture containing at least alkyl methacrylate in the presence of a latex containing a butadiene rubber polymer, wherein the amount of the butadiene rubber polymer included is in the range of 55 to 90% by mass, and the graft copolymer (B) is obtained by using 0.05 to 10 parts by mass of disodium alkylphenylether disulfonate with respect to 100 parts by mass of the graft copolymer (B).

Further, in order to achieve the object, the present invention provides a thermoplastic resin composition containing:

70 to 99% by mass of a thermoplastic resin (A2) containing polyester resin as an essential component; and 1 to 30% by mass of a graft copolymer (B) which is graft copolymer obtained by emulsion graft polymerization of a monomer or monomer mixture containing at least alkyl methacrylate in the presence of a latex containing a butadiene rubber polymer, wherein the amount of the butadiene rubber polymer included is in the range of 55 to 90% by mass, and the graft copolymer (B) is obtained by using 0.05 to 10 parts by mass of disodium alkylphenyl ether disulfonate with respect to 100 parts by mass of the graft copolymer (B).

BEST MODE FOR CARRYING OUT THE INVENTION

Any resin containing polycarbonate resin may be employed for the thermoplastic resin (A1) having a polycarbonate resin as an essential component in the present invention. Examples which may be cited include a polycarbonate resin/styrene resin alloy such as polycarbonate/ABS, a polycarbonate resin/polyester resin alloy such as polycarbonate/PBT, and the like. Among these, polycarbonate resins and polycarbonate resin/styrene resin alloys are preferably used.

Further, any resin containing polyester resin such as PET, PBT or the like may be employed for the thermoplastic resin (A2) having a polyester resin as an essential component in the present invention. Examples which may be cited include a polyester resin/styrene resin alloy such as PET/ABS, a (denatured) PPE resin/polyester resin alloy such as PPE/PBT or the like. Among these, PBT resin is preferably used.

The graft copolymer (B) employed in the present invention is a graft copolymer obtained by emulsion graft polymerization of a monomer or monomer mixture containing at least alkyl methacrylate in the presence of a latex containing a butadiene rubber polymer, wherein the amount of the butadiene rubber polymer included is in the range of 55 to 90% by mass, and the graft copolymer (B) is obtained by using 0.05 to 10 parts by mass of disodium alkylphenylether disulfonate with respect to 100 parts by mass of the graft copolymer. It is preferable to employ the disodium alkylphenylether disulfonate as an emulsifyier in this production process.

By using this thermoplastic resin containing graft copolymer (B), it is possible to obtain a thermoplastic resin composition capable of providing a molded article of superior impact strength and excellent resistance to hydrolysis and heat discoloration.

Next, the butadiene rubber polymer for obtaining the graft copolymer (B) will be explained.

A latex containing a butadiene rubber polymer can be obtained by emulsion polymerization of 1,3-butadiene and one or more kinds of vinyl monomer that are copolymerizable with 1,3-butadiene. When the total mass of the monomer employed to obtain the rubber polymer is designated as 100% by mass, it is preferable that the 1,3-butadiene be employed in an amount of 60% by mass or greater, and more preferably, in an amount of 65% by mass or greater. When the amount of 1,3-butadiene included is less than 60% by mass with respect to 100% by mass of total monomer, it is not possible to obtain sufficient impact resistance.

Examples of the vinyl monomer that is copolymerizable with 1,3-butadiene include aromatic vinyls such as styrene, and α-methyl styrene; alkyl methacrylates such as methyl methacrylate, and ethyl methacrylate; alkyl acrylates such as ethyl acrylate, and n-butyl acrylate; unsaturated nitriles such as acrylonitrile, and methacrylonitrile; vinyl ethers such as methyl vinyl ether, and butyl vinyl ether; halogenated vinyls such as vinyl chloride, and vinyl bromide; halogenated vinylidenes such as vinylidene chloride, and vinylidene bromide; vinyl monomers having a glycidyl group such as glycidyl acrylate, glycidyl methacrylate, aryl glycidyl ether, and ethylene glycol glycidyl ether; multifunctional monomers such as divinyl benzene, ethylene glycol dimethacrylate, and 1,3-butalene glycol dimethacrylate; and the like. One or more kinds of these vinyl monomers may be employed.

In the emulsion polymerization for obtaining the butadiene rubber polymer, disodium alkylphenylether disulfonate can be used as an emulsifier in the present invention.

In the emulsion polymerization for obtaining the butadiene rubber polymer, it is also possible to employ fatty acid salt such as potassium tallowate. When a fatty acid salt is employed, there is possibility that resistance to hydrolysis and heat discoloration may deteriorate as compared to a sulfonate. A sulfate such as sodium sodium lauryl sulfate or the like can be used, however, as compared to a sulfonate, there is possibility that resistance to mold discoloration may deteriorate.

Examples of the sulfonate that can be cited include sodium dodecylbenzene sulfonate and disodium alkylphenylether disulfonate. Of these, disodium alkylphenylether disulfonate is preferred from the perspective of resistance to hydrolysis and heat discoloration.

Note that it is also acceptable to employ known emulsifiers other than disodium alkylphenylether disulfonate for the emulsified graft polymer for obtaining the butadiene rubber polymer.

When disodium alkylphenylether disulfonate is employed for obtaining the butadiene rubber polymer, it is necessary to consider the amount of disodium alkylphenylether disulfonate used in the step for polymerizing the monomer, etc. having alkyl methacrylate as the main component for obtaining graft copolymer (B) explained below. Namely, it is necessary to adjust the employed amount when obtaining the butadiene rubber polymer and the employed amount when polymerizing the monomer having alkyl methacrylate as the main component and the like so that the total amount of disodium alkylphenylether disulfonate employed with respect to 100 parts by mass of graft copolymer (B) is in the range of 0.05 to 10.0 parts by mass.

The particle diameter of the butadiene rubber polymer is not particularly restricted. However, when taking into consideration the impact resistance of the thermoplastic resin composition containing the obtained graft copolymer (B) and the external appearance of the surface of the molded article made of the thermoplastic resin composition, it is preferable that the average particle diameter of the butadiene rubber polymer be in the range of 100 to 800 nm. When the average particle diameter is less than 100 nm, the impact resistance of the molded article obtained from the resin composition can deteriorate. Further, when the average particle diameter exceeds 800 nm, the impact resistance of the molded article obtained from the resin composition deteriorates, while at the same time the external appearance of the molded surface deteriorates.

Note that when various chain transfer agents or graft crossing agents are added to the vinyl monomer, it is possible to adjust the molecular weight and graft ratio of the butadiene rubber polymer, so that this is desirable.

A one-, two- or multi-step polymerization is possible for the polymerization method for obtaining a latex including a butadiene rubber polymer. In the case of a multi-step polymerization, it is preferable that a portion of the monomer employed in the polymerization be introduced in advance into the reaction system, and the remaining monomer be added all at once, in separate additions or continuously once polymerization is initiated. In this type of polymerization method, it is possible to achieve excellent polymerization stability and stably obtain a latex having the desired particle diameter and particle diameter distribution.

The graft copolymer (B) will now be explained.

The graft copolymer (B) can be obtained from a single-step or multi-step graft polymerization of a monomer containing alkyl methacrylate as the main component, or a monomer mixture of one or more kinds of another vinyl monomer that is copolymerizable with alkyl methacrylate, in the presence of a latex containing the butadiene rubber polymer.

A three-step graft polymerization is preferable.

The first step employs alkyl methacrylate as the main component and is carried out to improve impact resistance and compatiability with polyvinyl chloride resin.

The second step employs an aromatic vinyl compound as the main component and is carried out to increase fluidity of the graft copolymer.

The third step employs alkyl methacrylate as the main component and is carried out to improve the gloss of the surface of the vinyl chloride resin composition obtained.

A peroxide compound, an azo initiator, or a redox initiator combining an oxidizing agent and a reducing agent may be employed for the radical polymerization initiator used in the polymerization. Among these, the redox initiator is preferred, and a radical polymerization initiator combining ferrous sulfate/disodium ethylenediaminetetraacetate/Rongalite/hydroperoxide is particularly preferred.

Examples of the vinyl monomers that are copolymerizable with alkyl methacrylate include aromatic vinyls such as styrene, α-methyl styrene, and various halogen-substituted and alkyl-substituted styrenes; alkyl acrylates such as ethyl acrylate, and n-butyl acrylate; unsaturated nitriles such as acrylonitrile, and methacrylonitrile; and vinyl monomers having a glycidyl group such as glycidyl acrylate, glycidyl methacrylate, allyl glycidyl ether, and ethylene glycol glycidyl ether; and the like. These monomers may be used alone or in combinations of two or more.

The amount of the butadiene rubber polymer included in the graft copolymer (B) is set to be in the range of 55 to 90% by mass. When the amount of the butadiene rubber polymer included is less that 55% by mass, it is not possible to obtain sufficient impact resistance. On the other hand, when the amount of the butadiene rubber polymer included exceeds 90% by mass, the other superior properties of the thermoplastic resin composition tend to be lost.

During the graft polymerization, disodium alkylphenylether disulfonate is added as an emulsifier in order to stabilize the butadiene rubber polymer latex and to control the average particle diameter of the graft copolymer (B).

Note that when employing disodium alkylphenylether disulfonate in order to obtain the butadiene rubber polymer, it is necessary to give consideration to the amount of disodium alkylphenylether disulfonate employed previously in the step for polymerizing the monomer, etc., that has alkyl methacrylate as the main component. Namely, the employed amount for obtaining the butadiene rubber polymer and the employed amount for polymerizing the monomer, etc. having alkyl methacrylate as the main component, must be adjusted so that the amount of disodium alkylphenylether disulfonate becomes 0.05 to 10 parts by mass with respect to 100 parts by mass of the graft copolymer (B).

The total amount of disodium alkylphenylether disulfonate employed during the rubber polymerization and graft polymerizations is 0.05 to 10 parts by mass, and preferably 0.1 to 8 parts by mass, with respect to 100 parts by mass of the graft copolymer (B). When the amount employed is less than 0.05 parts by mass, coagulated material arises frequently in the polymer, and it is not possible to obtain long-term molding stability and releasability to a metal mold. On the other hand, when the amount of the emulsifier employed exceeds 10 parts by mass, foaming occurs readily during in the polymerization and productivity falls.

The graft copolymer (B) in powder form can be obtained by coagulating the obtained graft copolymer latex with or without the addition of a suitable oxidation inhibitor or an additive, to obtain a slurry, dehydrating this slurry by after heat-treating and solidifying it, and then drying, etc.

Metal salt compounds can be employed as the coagulating agent, with alkaline earth metal salt compounds such as magnesium sulfate, calcium acetate, calcium chloride and the like being preferable. Calcium salt compounds are more preferable from the perspective of resistance to hydrolysis.

When the salt generated from the emulsifier and the coagulating agent is a strong acid/base, the strong acid/base is not readily ionized and difficult to react with the radical generated by thermal decomposition of the thermoplastic resin, etc. to occur. For this reason, formation of a colored material does not readily occur and the hydrolysis reaction does not proceed, and it is thought that this is the reason why the resistance to heat discoloration and hydrolysis are superior.

The amount of the graft copolymer (B) included in the thermoplastic resin composition is set to be in the range of 1 to 30% by mass. When the amount of the graft copolymer (B) is less than 1% by mass, it is not possible to obtain sufficient impact resistance and adequate resistance to hydrolysis and heat discoloration cannot be obtained. On the other hand, when the amount of the graft copolymer (B) included exceeds 30% by mass, the other superior properties of the thermoplastic resin composition tend to be lost.

By employing alkaline metal salt compound (C) as a pH adjusting agent for the coagulated slurry liquid in the graft copolymer (B), it is possible to further improve resistance to heat discoloration and hydrolysis.

Alkaline metal salt compound (C) is not particularly restricted; for example, potassium hydroxide, sodium hydroxide or the like may be employed.

It is desirable to adjust the pH of the slurry liquid to be in the range of pH 8 to 10. Within this pH range, the remainder forms an aqueous salt. For this reason, the amount of remainder, which causes heat discoloration and hydrolysis in the washing step, decreases. When the pH is less than 7, the effect of reducing the remainder is not sufficient, while when the pH exceeds 10, the alkyl(meth)acrylate component included in the graft component breaks down and methacrylic acid may be generated.

The method for formulating the thermoplastic resin composition of the present invention is not particularly restricted. For example, a conventional technique may be employed such as a method in which a powder or particulate material is mixed using a Henschel mixer or tumbler, and then melted and mixed in an extruding machine, kneader, or mixer; a method in which other components are gradually mixed into a component that was melted in advance; and a method in which a mixture is molded in an injection molding device.

A heat or light stabilizing agent, such as a phenol or phosphite stabilizing agent, a UV absorbing agent, or an amine light stabilizing agent, may be added to the thermoplastic resin composition of the present invention. It is also acceptable to add conventionally known flame retardants such as phosphorus flame retardants, bromide flame retardants, silicon flame retardants, or organic metal salt flame retardants may be added. Further, a modifying agent for improving resistance to hydroylis, etc., filling agents such as titanium oxide, talc, etc., pigments, plasticizers and the like, may be added as necessary.

The present invention will now be explained more concretely using the following examples. Note that the following methods were employed for measuring the various physical properties in the Examples and Comparative Examples.

(1) Mass Average Particle Diameter (dw)

Latex containing the obtained butadiene rubber polymer that was diluted to a concentration of approximately 3% with distilled water was employed as the sample, and was measured using a CHDF 2000 model particle distribution measuring system which is produced by the U.S. company Matec Applied Science. The measurement conditions were performed using the standard conditions recommeded by Matec. Namely, 0.1 ml of the dilute latex sample having a concentration of approximately 3% was used in the measurement while maintaining standard conditions (a specialized particle separating capillary cartridge and carrier fluid were employed, liquid: neutral, flow speed: 1.4 ml/min, pressure: approximately 4,000 psi, and temperature: 35° C.). Twelve kinds of a solution containing dispersed polystyrene having a known particle diameter within the range of 0.02 μm to 0.8 μm manufactured by the U.S. Company Duke Scientific Corporation were employed for a material having a standard particle diameter.

(2) Izod Impact Strength

The resin composition was melted and kneaded at a specific cylinder temperature in a 30 mmφ biaxial extruder, and formed into pellets to obtain various resin compositions. Test pieces were then obtained using injection molding. The evaluation was measured in accordance with ASTM D-256.

(3) Resistance to Hydrolysis

The formed pellets were humidified for 60 hours at 120° C. in a 100% RH atmosphere, and the melt index before and after time was measured. Measurement conditions: 250° C.×2.16 kgf (4) Resistance to Heat Discoloration The formed pellets were left undisturbed in a gear oven at 120° C. for 24 hours, and the coloring before and after was visually appraised using a five step evaluation.

Evaluation standard:
excellent (no coloring) 5 4 3 2 1 poor (coloring present)

EXPERIMENTAL EXAMPLE 1

(1) Production of Butadiene Rubber Polymer Latex

The following materials were introduced into a 70 L-autoclave for the first monomer. Once the temperature rose to 43° C., the following redox initiator was added to the reaction vessel. Once the reaction started, the temperature was further increased to 65° C.

| <First monomer> | |
|---|---|
| 1,3-butadiene | 20.9 parts |
| styrene | 1.1 parts |
| p-menthane hydroperoxide | 0.1 parts |
| sodium pyrophosphate | 0.5 parts |
| disodium alkylphenylether disulfonate | 0.5 parts |
| deionized water | 70 parts |
| <Redox initiator> | |
| ferrous sulfate | 0.0003 parts |
| disodium ethylenediaminetetraacetate | 0.0009 parts |
| Rongalite | 0.3 parts |
| deionized water | 5 parts |

Two hours after the start of polymerization, the following polymerization initiator was added to the reaction vessel, and immediately thereafter, the following second monomer, emulsifier, and deionized water were added by continuous dripping over two hours.

| <Polymerization initiator> | |
|---|---|
| p-menthane hydroperoxide | 0.2 parts |
| <Second monomer> | |
| 1,3-butadiene | 74.1 parts |
| styrene | 3.9 parts |
| <Emulsifier and deionized water> | |
| disodium alkylphenylether disulfonate | 1.5 parts |
| deionized water | 75 parts |

The mixture was allowed to react for 20 hours from the start of polymerization, to obtain a butadiene rubber polymer latex. The mass average particle diameter of the obtained butadiene rubber polymer latex was 100 nm.

(2) Production of Graft Polymer (B1)

75 parts of solid of the butadiene rubber polymer latex obtained in the polymerization, 1.0 part of disodium alkylphenylether disulfonate, and 0.6 parts of Rongalite were introduced into a nitrogen-substituted flask, and maintained at an internal temperature of 70° C. Next, a mixture containing 7.5 parts of methyl methacrylate, 1.5 parts of ethyl acrylate, and 0.3 parts of cumene hydroperoxide was added to 100 parts of the monomer mixture by dripping over 1 hour, and thereafter maintained for 1 hour.

Next, as the second step, a mixture containing 15 parts of styrene and cumene hydroperoxide, of which the amount corresponded to 0.3 parts relative to 100 parts of styrene (i.e., a mixture containing 15 parts of styrene and 0.045 parts of cumene hydroperoxide) was added by dripping over 1 hour in the presence of the polymer obtained in the previous step, and thereafter maintained for 3 hours.

Next, as the third step, a mixture containing 6 parts of methyl methacrylate and cumene hydroperoxide of which the amount corresponded to 0.3 parts relative to 100 parts of methyl methacrylate (i.e., a mixture containing of 6 parts of methyl methacrylate and 0.018 parts of cumene hydroperoxide) was added by dripping over 0.5 hours in the presence of the polymer obtained in the first and second steps, and thereafter maintained for 1 hour to complete the polymerization and obtain the graft copolymer latex.

After adding 0.5 parts of butylated hydroxytoluene to the obtained graft copolymer latex, a 20%-calcium acetate aqueous solution was added to cause coagulation, and then heated at 90° C. The coagulated material was then washed in warm water, and dried further to obtain graft copolymer (B1).

EXPERIMENTAL EXAMPLE 2

(1) Production of Butadiene Rubber Polymer Latex

Polymerization was carried out in the same manner as for the butadiene rubber polymer used in Experimental Example 1, with the exception that the amount of disodium alkylphenylether disulfonate during introduction of the first monomer was 0.1 parts, and the amount of disodium alkylphenylether disulfonate during the addition was 1.9 parts. The reaction was allowed to proceed for 25 hours from the start of polymerization, to obtain a butadiene rubber polymer latex.

The mass average particle diameter of the obtained butadiene rubber polymer latex was 200 nm.

(2) Production of Graft Copolymer (B2)

The butadiene rubber polymer latex obtained in the polymerization was employed and a graft polymerization was carried out in the same manner as Experimental Example 1, to obtain graft copolymer (B2).

EXPERIMENTAL EXAMPLE 3

(1) Production of Butadiene Rubber Polymer Latex

The following materials were introduced into a 70 L-autoclave as the first monomer. Once the temperature rose to 43° C., a redox initiator was added to the reaction vessel. Once the reaction started, the temperature was further raised to 65° C.

| <First monomer> | |
|---|---|
| 1,3-butadiene | 22.8 parts |
| styrene | 7.2 parts |
| p-menthane hydroperoxide | 0.1 parts |
| sodium pyrophosphate | 0.5 parts |
| disodium alkylphenylether disulfonate | 0.1 part |
| deionized water | 70 parts |
| <Redox-type initiator> | |
| ferrous sulfate | 0.0003 parts |
| disodium ethylenediaminetetraacetate | 0.0009 parts |
| Rongalite | 0.3 parts |
| deionized water | 5 parts |

Two hours after the start of polymerization, the following initiator was added to the reaction vessel, and immediately thereafter, the second monomer, emulsifier, and deionized water were added by continuous dripping over two hours.

| <Polymerization initiator> | |
|---|---|
| p-menthane hydroperoxide | 0.2 parts |
| <Second monomer> | |
| 1,3-butadiene | 53.2 parts |
| styrene | 16.8 parts |
| <Emulsifier and deionized water> | |
| disodium alkylphenylether disulfonate | 1.9 parts |
| deionized water | 75 parts |

The mixture was allowed to react for 15 hours from the start of polymerization, to obtain a butadiene rubber polymer latex. The mass average particle diameter of the obtained butadiene rubber polymer latex was 200 nm.

(2) Production of Graft Copolymer (B3)

The butadiene rubber polymer latex obtained in the polymerization was employed and a graft polymerization was carried out in the same manner as Experimental Example 1 to obtain graft copolymer (B3).

EXPERIMENTAL EXAMPLE 4

(1) Production of Butadiene Rubber Polymer Latex

A butadiene rubber polymer latex was obtained in the same manner as in Experimental Example 2.

(2) Production of Graft Copolymer (B4)

A graft polymerization was carried out in the same manner as in Experimental Example 1, with the exception that the butadiene rubber polymer latex obtained in the polymerization was employed and 3.0 parts of disodium alkylphenylether disulfonate was used when carrying out the graft polymerization to obtain graft copolymer (B4).

EXPERIMENTAL EXAMPLE 5

(1) Production of Butadiene Rubber Polymer Latex

A butadiene rubber polymer latex was obtained in the same manner as in Experimental Example 2.

(2) Production of Graft Copolymer (B5)

A graft polymeriztion was carried out in the same manner as in Experimental Example 1, with the exception that the butadiene rubber polymer latex obtained in the polymerization was employed and a 20%-calcium chloride aqueous solution was employed in place of the 20%-calcium acetate aqueous solution to obtain graft copolymer (B5).

EXPERIMENTAL EXAMPLE 6

(1) Production of Butadiene Rubber Polymer Latex

A butadiene rubber polymer latex was obtained in the same manner as in Experimental Example 2.

(2) Production of Graft Copolymer (B6)

A graft polymerization was carried out in the same manner as in Experimental Example 1, with the exception that the butadiene rubber polymer latex obtained in the polymerization was employed and a 10%-ammonium sulfate aqueous solution was employed in place of the 20%-calcium acetate aqueous solution, to obtain graft copolymer (B6).

EXPERIMENTAL EXAMPLE 7

(1) Production of Butadiene Rubber Polymer Latex

A butadiene rubber polymer latex was obtained in the same manner as Experimental Example 2.

(2) Production of Graft Copolymer (B7)

A graft polymerization was carried out in the same manner as in Experimental Example 1, with the exception that 80 parts of the solid of the butadiene rubber polymer latex obtained in the polymerization was employed to obtain graft copolymer (B7).

EXPERIMENTAL EXAMPLE 8

A graft copolymer (B8) was obtained by spray drying the graft copolymer latex obtained in Experimental Example 2.

EXPERIMENTAL EXAMPLE 9

(1) Production of Butadiene Rubber Polymer Latex

A butadiene rubber polymer latex was obtained in the same manner as in Experimental Example 2.

(2) Production of Graft Copolymer (B9)

The butadiene rubber polymer latex obtained in the polymerization was employed, coagulated in a 20%-calcium acetate aqueous solution, and heat treated. Next, graft polymerization was carried out in the same manner as in Experimental Example 1, with the exception that the pH of the recovered powder was adjusted to pH 8.5 (slightly alkaline) using 5%-potassium hydroxide aqueous solution, and washed in deionized warm water to obtain graft polymer (B9).

EXPERIMENTAL EXAMPLES 10 TO 12

Graft copolymer (B2) was obtained using the same method as in Experimental Example 2.

Comparative Experimental Example 1

(1) Production of Butadiene Rubber Polymer Latex

A butadiene rubber polymer latex was obtained in the same manner as m Experimental Example 2.

(2) Production of Graft Copolymer (b1)

A graft polymerization was carried out in the same manner as in Example 1, with the exception that 50 parts of the solid of the butadiene rubber polymer latex obtained in the polymerization was employed to obtain graft copolymer (b1).

Comparative Experimental Example 2

(1) Production of Butadiene Rubber Polymer Latex

A butadiene rubber polymer latex was obtained in the same manner as in Experimental Example 2.

(2) Production of Graft Copolymer (b2)

A graft polymerization was carried out in the same manner as in Experimental Example 1, with the exception that 95 parts of the solid of the butadiene rubber polymer latex obtained in the polymerization was employed to obtain graft copolymer (b2).

Comparative Experimental Examples 3 and 4

Graft copolymer (B2) was obtained using the same method as in Experimental Example 2.

Comparative Experimental Example 5

(1) Production of Butadiene Rubber Polymer Latex

A butadiene rubber polymer latex was obtained in the same manner as in Experimental Example 2, with the exception that sodium lauryl sulfate was employed in place of the disodium alkylphenylether disulfonate. The mass average particle diameter of the obtained butadiene rubber polymer latex was 200 nm.

(2) Production of Graft Copolymer (b5)

A graft polymerization was carried out in the same manner as in Experimental Example 1, with the exception that the butadiene rubber polymer latex obtained in the polymerization was employed, and sodium lauryl sulfate was employed in place of the disodium alkylphenylether disulfonate to obtain graft copolymer (b5).

Comparative Experimental Example 6

(1) Production of Butadiene Rubber Polymer Latex

A butadiene rubber polymer latex was obtained in the same manner as in Experimental Example 2, with the exception that sodium dodecylbenzene sulphonate was employed in place of the disodium alkylphenylether disulfonate. The mass average particle diameter of the obtained butadiene rubber polymer latex was 200 nm.

(2) Production of Graft Copolymer (b6)

Graft polymerization was carried out in the same manner as in Experimental Example 1, with the exception that the butadiene rubber polymer latex obtained in the polymerization was employed, and sodium dodecylbenzene sulphonate was employed in place of the disodium alkylphenylether disulfonate to obtain graft copolymer (b6).

Comparative Experimental Example 7

(1) Production of Butadiene Rubber Polymer Latex

A butadiene rubber polymer latex was obtained in the same manner as in Experimental Example 2, with the exception that sodium oleate was employed in place of the disodium alkylphenylether disulfonate. The mass average particle diameter of the obtained butadiene rubber polymer latex was 200 nm.

(2) Production of Graft Copolymer (b7)

The production of graft copolymer (b7) was carried out in the same way as in Experimental Example 1, with the exception that sodium oleate was employed in place of the disodium alkylphenylether disulfonate.

Comparative Experimental Examples 8 to 11

(1) Production of Butadiene Rubber Polymer Latex

A butadiene rubber polymer latex was obtained in the same manner as in Comparative Experimental Example 7.

(2) Production of Graft Copolymers (b8-b 11)

The production of graft copolymers (b8-b11) was carried out in the same manner as in Experimental Example 2, with the exception that the butadiene rubber polymer latex obtained in the polymerization was employed, coagulated by adding a 10%-sulfuric acid aqueous solution in place of the 20%-calcium acetate aqueous solution, and heat treated at 90° C. to harden.

Examples 1-4, 7 and 9, Comparative Examples 1-8, and Reference No./Examples 1 to 3

A bisphenol A type polycarbonate (lupilon S2200F, manufactured by Mitsubishi Engineering-Plastics Corporation) having a viscosity-average molecular weight of approximately 22,000 employed as thermoplastic resin (A1) having polycarbonate resin as an essential component, an organic alkaline metal salt flame retardant (Bayowet, manufactured by Bayer Corporation.) employed as the flame retardant, and the graft copolymers (B1 to B9 and b1 to b8) obtained in the previous Experimental Examples and Comparative Experimental Examples, were measured at the proportions shown in Table 1, mixed in a Henschel mixer for 4 minutes, subjected thereafter to melting and kneading at a cylinder temperature of 260° C. in a 30 mmφ-biaxial extruder, and then formed into pellets to obtain a thermoplastic resin composition. Test pieces were then obtained by injection molding of this composition, and these were then employed for evaluation. The results of the evaluation are shown in Table 1.

Example 10 and Comparative Example 9

A bisphenol A type polycarbonate (TARFLON® FN1700A, manufactured by Idemitsu Petrochemical Co.) having a viscosity-average molecular weight of approximately 17,000 and AS resin (SR30B, manufactured by UBE CYCON, LTD.) employed as thermoplastic resin (A1) having polycarbonate resin as an essential component, an organic alkaline metal salt flame retardant (Bayowet, manufactured by Bayer Corporation.) employed as the flame retardant, and the graft copolymers (B10 and b9) obtained in the previous Experimental Examples and Comparative Experimental Examples, were measured at the proportions shown in Table 1, mixed in a Henschel mixer for 4 minutes, subjected thereafter to melting and kneading at a cylinder temperature of 280° C. in a 30 mmφ-biaxial extruder, and then formed into pellets to obtain thermoplastic resin compositions. Test pieces were then obtained by injection molding of these compositions, and these were then employed for evaluation. The results of the evaluation are shown in Table 1.

Example 11 and Comparative Example 10

A bisphenol A type polycarbonate (Lexan 141R, manufactured by GE Plastics) having a viscosity-average molecular weight of approximately 23,000 and the unsaturated polyester resin polybutylene terephthalate (Valox 325, manufactured by GE Plastics) having a limiting viscosity ($\eta$) of 1.05 employed as thermoplastic resin (A1) having polycarbonate resin as an essential component, and the graft copolymers (B11 and b10) obtained in the previous Experimental Examples and Comparative Experimental Examples, were measured at the proportions shown in Table 1, mixed in a Henschel mixer for 4 minutes, subjected thereafter to melting and kneading at a cylinder temperature of 260° C. in a 30 mmφ biaxial extruder, and then formed into pellets to obtain thermoplastic resin compositions. Test pieces were then obtained by extrusion molding of these compositions, and these were then employed for evaluation. The results of the evaluation are shown in Table 1.

Example 12 and Comparative Example 11

Polybutylene terephthalate resin (TUFPET® N1000, manufactured by Mitsubishi Rayon Co., Ltd.) employed as thermoplastic resin (A2) having polyester resin as an essential component, and the graft copolymers (B2 and b11) obtained in the previous Examples and Comparative Examples were measured at the proportions shown in Table 1, mixed in a Henschel mixer for 4 minutes, subjected thereafter to melting and kneading at a cylinder temperature of 240° C. in a 30 mmϕ-biaxial extruder, and then formed into pellets to obtain thermoplastic resin compositions. Test pieces were then obtained by injectionion molding of these compositions, and these were then employed for evaluation. The results of the evaluation are shown in Table 1.

TABLE 1

| | | GRAFT COPOLYMER (B) | | | | | | | | | |
|---|---|---|---|---|---|---|---|---|---|---|---|
| | | Rubber portion | | Rubber | | | | Graft structure | | | |
| | Graft | | Particle | polymer | Emulsifier | | | | Second | Third | |
| | copolymer | Type of | | diameter | content | | Total amt. | First step | | step | step | Coagulating |
| | employed | rubber | Composition | (nm) | (%) | Type | employed (%) | MMA | EA | St | MMA | agent |
| Ex. 1 | B1 | Bd/St | 95/5 | 100 | 75 | DPEDS | 2.5 | 7.5 | 1.5 | 15 | 6 | Ca acetate |
| Ex. 2 | B2 | Bd/St | 95/5 | 200 | 75 | DPEDS | 2.5 | 7.5 | 1.5 | 15 | 6 | Ca acetate |
| Ex. 3 | B3 | Bd/St | 76/24 | 200 | 75 | DPEDS | 2.5 | 7.5 | 1.5 | 15 | 6 | Ca acetate |
| Ex. 4 | B4 | Bd/St | 95/5 | 200 | 75 | DPEDS | 4.5 | 7.5 | 1.5 | 15 | 6 | Ca acetate |
| Ex. 5 | B5 | Bd/St | 95/5 | 200 | 75 | DPEDS | 2.5 | 7.5 | 1.5 | 15 | 6 | Ca chloride |
| Reference No./Example 1 | B6 | Bd/St | 95/5 | 200 | 75 | DPEDS | 2.5 | 7.5 | 1.5 | 15 | 6 | Al sulfate |
| Ex. 7 | B7 | Bd/St | 95/5 | 200 | 80 | DPEDS | 2.6 | 7.5 | 1.5 | 15 | 6 | Ca acetate |
| Reference No./Example 2 | B8 | Bd/St | 95/5 | 200 | 75 | DPEDS | 2.5 | 7.5 | 1.5 | 15 | 6 | SD |
| Ex. 9 | B9 | Bd/St | 95/5 | 200 | 75 | DPEDS | 2.5 | 95 | 5 | — | — | Ca acetate |
| Ex. 10 | B2 | Bd/St | 95/5 | 200 | 75 | DPEDS | 2.5 | 7.5 | 1.5 | 15 | 6 | Ca acetate |
| Ex. 11 | B2 | Bd/St | 95/5 | 200 | 75 | DPEDS | 2.5 | 7.5 | 1.5 | 15 | 6 | Ca acetate |
| Ex. 12 | B2 | Bd/St | 95/5 | 200 | 75 | DPEDS | 2.5 | 7.5 | 1.5 | 15 | 6 | Ca acetate |
| Comp. Ex. 1 | b1 | Bd/St | 95/5 | 200 | 50 | DPEDS | 2.0 | 7.5 | 1.5 | 15 | 6 | Ca acetate |
| Comp. Ex. 2 | b2 | Bd/St | 95/5 | 200 | 95 | DPEDS | 1.1 | 7.5 | 1.5 | 15 | 6 | Ca acetate |
| Comp. Ex. 3 | B2 | Bd/St | 95/5 | 200 | 75 | DPEDS | 2.5 | 7.5 | 1.5 | 15 | 6 | Ca acetate |
| Comp. Ex. 4 | B2 | Bd/St | 95/5 | 200 | 75 | DPEDS | 2.5 | 7.5 | 1.5 | 15 | 6 | Ca acetate |
| Comp. Ex. 5 | b5 | Bd/St | 95/5 | 200 | 75 | SLS | 2.5 | 7.5 | 1.5 | 15 | 6 | Ca acetate |
| Comp. Ex. 6 | b6 | Bd/St | 95/5 | 200 | 75 | DBSNa | 2.5 | 7.5 | 1.5 | 15 | 6 | Ca acetate |
| Comp. Ex. 7 | b7 | Bd/St | 95/5 | 200 | 75 | OANa | 2.5 | 7.5 | 1.5 | 15 | 6 | Ca acetate |
| Comp. Ex. 8 | b8 | Bd/St | 95/5 | 200 | 75 | OANa | 2.5 | 7.5 | 1.5 | 15 | 6 | Sulfuric acid |
| Comp. Ex. 9 | b9 | Bd/St | 95/5 | 200 | 75 | OANa | 2.5 | 7.5 | 1.5 | 15 | 6 | Sulfuric acid |
| Comp. Ex. 10 | b10 | Bd/St | 95/5 | 200 | 75 | OANa | 2.5 | 7.5 | 1.5 | 15 | 6 | Sulfuric acid |
| Comp. Ex. 11 | b11 | Bd/St | 95/5 | 200 | 75 | OANa | 2.5 | 7.5 | 1.5 | 15 | 6 | Sulfuric acid |

| | Thermoplastic resin | | | | | | Resistance | Visual evaluation | |
|---|---|---|---|---|---|---|---|---|---|
| | | Resin | Graft copolymer | Flame retardant | IZOD strength 23° C. | IZOD strength −30° C. | to hydrolysis ΔMI | of heat discoloration Gear oven | |
| | Type of resin | (%) | (%) | (parts) | J/m | J/m | g/10 min | Before | After |
| Ex. 1 | A1 PC | 90 | 10 | 0.1 | 740 | 690 | 0.5 | 5 | 5 |
| Ex. 2 | A1 PC | 90 | 10 | 0.1 | 750 | 680 | 0.5 | 5 | 5 |
| Ex. 3 | A1 PC | 90 | 10 | 0.1 | 690 | 600 | 0.6 | 5 | 5 |
| Ex. 4 | A1 PC | 90 | 10 | 0.1 | 730 | 680 | 0.5 | 5 | 5 |
| Ex. 5 | A1 PC | 90 | 10 | 0.1 | 720 | 670 | 0.7 | 5 | 5 |
| Reference No./Example 1 | A1 PC | 90 | 10 | 0.1 | 730 | 680 | 0.6 | 5 | 4 |
| Ex. 7 | A1 PC | 90 | 10 | 0.1 | 780 | 700 | 0.6 | 5 | 5 |
| Reference No./Example 2 | A1 PC | 90 | 10 | 0.1 | 770 | 680 | 0.7 | 5 | 4 |
| Ex. 9 | A1 PC | 90 | 10 | 0.1 | 850 | 760 | 0.5 | 5 | 5 |
| Ex. 10 | A1 PC/AS (8/2) | 90 | 10 | 0.1 | 600 | 350 | 0.3 | 5 | 5 |
| Ex. 11 | A1 PC/PBT (5/5) | 90 | 10 | — | 790 | 620 | 0.4 | 5 | 5 |
| Ex. 12 | A2 PBT | 90 | 10 | — | 490 | 320 | 0.3 | 5 | 5 |
| Comp. Ex. 1 | A1 PC | 90 | 10 | 0.1 | 500 | 320 | 0.4 | 5 | 5 |
| Comp. Ex. 2 | A1 PC | 90 | 10 | 0.1 | 400 | 300 | 0.8 | 5 | 5 |
| Comp. Ex. 3 | A1 PC | 99.5 | 0.5 | 0.1 | 800 | 100 | 0.5 | 5 | 5 |
| Comp. Ex. 4 | A1 PC | 50 | 50 | 0.1 | 500 | 280 | 0.6 | 5 | 5 |
| Comp. Ex. 5 | A1 PC | 90 | 10 | 0.1 | 750 | 660 | 0.6 | 2 | 3 |
| Comp. Ex. 6 | A1 PC | 90 | 10 | 0.1 | 740 | 680 | 0.8 | 3 | 3 |
| Comp. Ex. 7 | A1 PC | 90 | 10 | 0.1 | 800 | 650 | 12.8 | 2 | 1 |
| Comp. Ex. 8 | A1 PC | 90 | 10 | 0.1 | 780 | 640 | 15.5 | 1 | 1 |

TABLE 1-continued

| | | | | | | | | | |
|---|---|---|---|---|---|---|---|---|---|
| Comp. Ex. 9 | A1 | PC/AS (8/2) | 90 | 10 | 0.1 | 760 | 350 | 20.2 | 1 | 1 |
| Comp. Ex. 10 | A1 | PC/PBT (5/5) | 90 | 10 | — | 780 | 400 | 18.1 | 1 | 1 |
| Comp. Ex. 11 | A2 | PBT | 90 | 10 | — | 300 | 220 | 15.7 | 1 | 1 |

The following abbreviations were used for the names of the emulsifiers in Table 1.
DPEDS: sodium alkyldiphenylether disulfonate (Pelex SS-L, Kao Corp.)
DBSNa: sodium dodecylbenzene sulfonate (Neopelex G-15, Kao Corp.)
SLS: sodium lauryl sulfate (Emal 2F, Kao Corp.)
OANa: sodium oleate (Nonsoul TK-1, Kao Corp.)

INDUSTRIAL APPLICABILITY

The thermoplastic resin composition according to the present invention demonstrates impact strength, and high resistance to hydrolysis and heat discoloration without impairing the essential properties of the thermoplastic resin. As a result, it can be used as a molding material in such wide fields as the OA equipment field, electric household appliance field and the like.

The invention claimed is:

1. The thermoplastic composition containing:
70 to 99% by mass of thermoplastic resin (A1) containing a polycarbonate resin as an essential component; and
1 to 30% by mass of graft copolymer (B) which is a graft copolymer obtained by emulsion graft polymerization of a monomer or monomer mixture containing at least alkyl methacrylate in the presence of a latex containing a butadiene rubber polymer, wherein the amount of said butadiene rubber polymer included is in the range of 55 to 90% by mass, and said graft copolymer (B) is obtained by using 0.05 to 10 parts by mass of disodium alkylphenylether disulfonate with respect to 100 parts by mass of said graft copolymer (B), and a calcium salt compound as a coagulating agent,
wherein the graft copolymer (B) consists of polymerized monomer units of the methylmethacrylate, the butadiene and one or more selected from the group consisting of an aromatic vinyl monomer, an alkyl (meth)acrylate monomer, an unsaturated nitrile monomer, halogenated vinyl monomer and a vinyl ether monomer.

2. The thermoplastic composition of claim 1, wherein the graft copolymer (B) consists of polymerized monomer units of the methylmethacrylate, the butadiene and one or more selected from the group consisting of styrene, α-methylstyrene, ethylmethacrylate, ethylacrylate, n-butyl acrylate, acrylonitrile, methacrylonitrile, methylvinyl ether, butylvinyl ether, vinyl chloride, vinyl bromide, vinylidene chloride and vinylidene bromide.

* * * * *